Dec. 8, 1953 J. M. VAN HOFWEEGEN 2,662,215

CIRCUIT FOR FREQUENCY MODULATION OF A LOCAL-OSCILLATOR OSCILLATION

Filed Sept. 5, 1951

INVENTOR
JOHANNES MARINUS VAN HOFWEEGEN
BY
Fred M Vogel AGENT

Patented Dec. 8, 1953 2,662,215

UNITED STATES PATENT OFFICE 2,662,215

CIRCUIT FOR FREQUENCY MODULATION OF A LOCAL-OSCILLATOR OSCILLATION

Johannes Marinus van Hofweegen, Eindhoven, Netherlands, assignor to Hartford National Bank and Trust Company, Hartford, Conn., as trustee Application September 5, 1951, Serial No. 245,115

3 Claims. (Cl. 332—28)

This invention relates to a circuit for frequency modulating a local-oscillator by means of a multi-control grid modulator coupled therewith. More particularly its object is to provide a circuit having a substantially linear modulation characteristic curve with, for example, an amount of distortion of less than −60 db at 1% frequency modulation.

Many suggestions have been previously made for making the modulation characteristic curve of a frequency-modulated oscillator more linear. Thus, for example, it has been suggested to rectify the anode alternating current of the modulator tube and feedback this rectified current to the input circuit of this tube in phase opposition to the modulating voltage. However, it has been found experimentally such a circuit is not practical for local oscillations of high frequency, for example 30 megacycles per sec., because of stray capacitance. It has also been suggested that low-frequency positive or negative feedback for the modulator tube be used, but this back-coupling differs for the various specimens of one tube type so that readjustment is necessary each time the tube is charged.

Researches on which the invention is based reveal that if the high-frequency oscillation from the oscillator circuit is fed, for example, to the first control grid of a modulator pentode and the low-frequency modulating oscillation to the suppressor grid used as a second control grid, a low amount of distortion results for a very definite value of the negative grid bias voltage of the latter grid. However, the adjustment of this grid bias voltage for this purpose is very critical and differs from tube to tube so that renewed adjustment is necessary each time the tube is charged.

Because of this invention it is now possible to satisfy stringent linearity requirements of the modulation circuit in a very simple manner without requiring critical adjustment of the modulator tube. According to the invention, the nonlinearity of the modulation characteristic curve which is due to the modulation of the local-oscillator oscillation at a first control grid and the modulating oscillation at a second control grid of the modulator is compensated for by also feeding the modulating oscillation to the first grid.

In order that the invention may be more clearly understood and readily carried into effect, it will be described more fully with reference to the accompanying drawing, in which.

Figure 1:
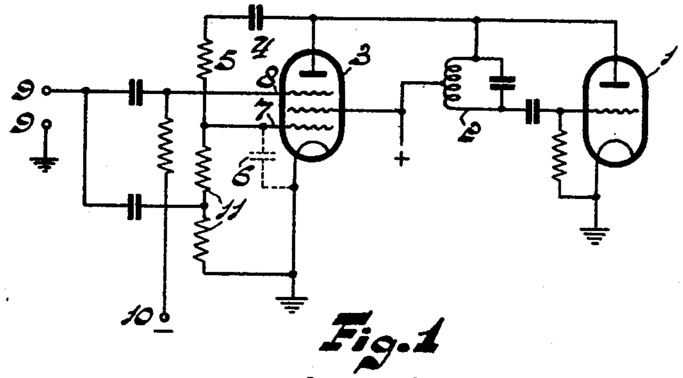
Fig. 1 shows by way of example one embodiment.

Referring to Fig. 1, 1 designates an oscillator tube whose anode voltage is fed back regeneratively to the control grid via a tuned circuit 2. The voltage across the circuit 2 is fed to the first control grid 7 of this tube via a blocking capacitor 4 and a phase shifting network having a shift of approximately 90° and comprising a resistor 5 and the grid-cathode-stray-capacity 6 of a modulator tube 3 so that the current passing through this tube is in quadrature with the voltage across the circuit 2. Thus, the circuit acts as if a reactance were connected in parallel with the circuit 2. The suppressor grid of the tube 3 used as the second control grid 8 has fed to it a modulating oscillation from the terminals 9 so that the mutual conductance of the tube 3, and hence the reactance connected, as it were, in parallel with the circuit 2, varies in accordance with this modulating oscillation thereby affecting frequency modulation of the oscilator oscillation.

Figure 2:
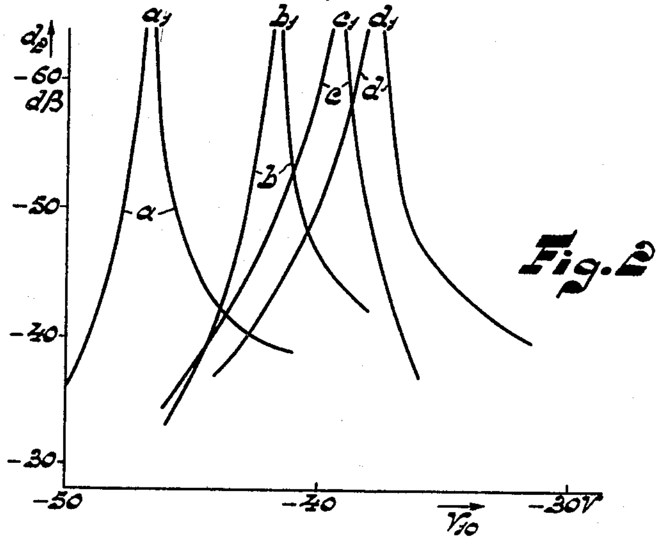
Figs. 2 and 3 show characteristic distortion curves.

It is found that the characteristic modulation curve obtained, i. e., the frequency modulation as a function of the modulating oscillation, exhibits a considerable amount of distortion, substantially second harmonic distortion, which varies widely with the negative bias voltage of the second control grid 8. In Fig. 2, the curves *a*, *b*, *c* and *d* represent four characteristic curves measured for four specimens of the tube type EF50 for the second harmonic distortion $d_2$, as a function of the negative bias voltage $V_{10}$ which is applied via the terminal 10 to the second control grid 8. As may be seen from the figure, each tube has a very definite value of $V_{10}$, namely, at $a_1$, $b_1$, $c_1$ and $d_1$, respectively, at which a very low second harmonic is produced. However, this low harmonic increases rapidly even at a slight incorrect adjustment of $V_{10}$. In addition, it may be seen that the optimum negative bias voltage differs from tube to tube, so that upon exchange of the modulator tube 3 it is necessary to re-adjust the negative bias voltage of the control grid 8.

Figure 3:
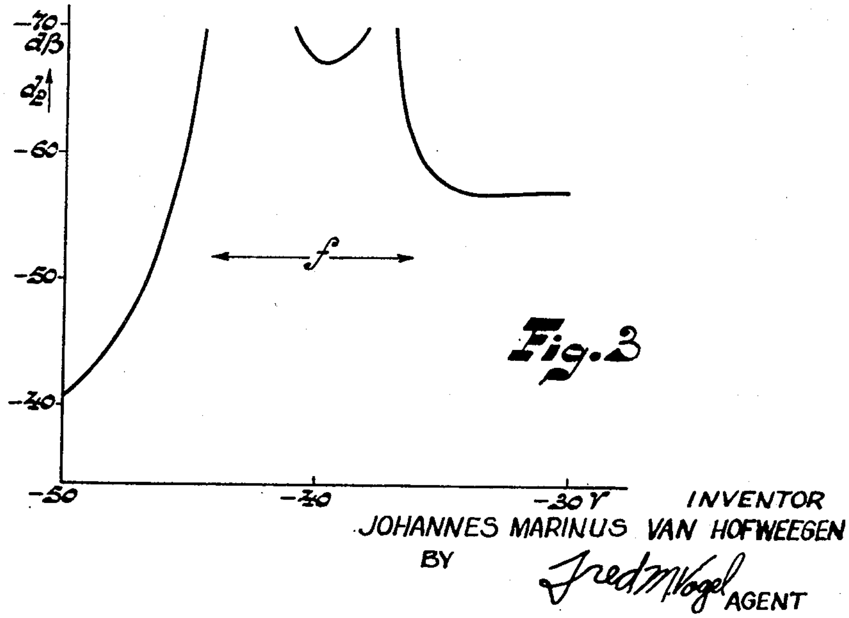

According to the invention, the modulating voltage is also applied to the first control grid 7 of the modulator tube. This results not only in increased frequency modulation of the oscillation produced, but also in substantially complete compensation of the distortion so that, for the second harmonic distortion $d_2$ the characteristic curve shown in Fig. 3 is found. It is surprising to find that the result thus achieved is considerably more favorable than that achieved by the distortion neutralizing methods suggested before. More particularly, various pentode tube types such as the EF50, the EF42, and the EF80 are found to yield favorable results. The region *f* in Fig. 3 in which the second harmonic distortion is less than −60 db, has also increased to a marked extent so that various tube specimens of the same tube type can be operated at the same negative bias voltage of the second control grid 8. However, this negative bias voltage differs for the various tube types. Thus, for example, the optimum adjustment for the EF50 lies between −35 volts and −45 volts and that for the EF42 in the neighbourhood of −10 volts.

Although it is common practice to produce the negative grid bias voltage of the first control grid 7 with the use of a decoupled cathode resistor, experiment now shows that a low amount of distortion results if this cathode resistor is omitted, the negative grid voltage being produced by grid current rectification via the grid leak resistor 11.

What I claim is:

1. In apparatus for frequency modulating the oscillations produced by a local oscillator provided with a frequency determining tuned circuit in accordance with an applied signal, a frequency modulator having a substantially linear modulation characteristic, said modulator comprising an electron discharge device having a cathode, first and second control grids and an anode, said cathode and said anode being coupled to the tuned circuit of said local oscillator, means to supply oscillations from said local oscillator and said applied signal to said first and second grids respectively to effect frequency modulation of said oscillator, and means to compensate for non-linearities in said frequency modulation including further means to supply said applied signal to said first grid.

2. In apparatus for frequency modulating the oscillations produced by a local oscillator provided with a frequency determining tuned circuit in accordance with an applied signal, a frequency modulator having a substantially linear modulation characteristic, said modulator comprising an electron discharge pentode tube having a cathode, a control grid, a suppressor grid and an anode, said cathode and said anode being coupled to said tuned circuit of said local oscillator, means to supply oscillations from said local oscillator and said applied signal to said control and suppressor grids respectively to effect frequency modulation of said oscillator, and means to compensate for non-linearities in said frequency modulation including further means to supply said applied signal to said control grid.

3. Apparatus as set forth in claim 2 wherein said frequency modulator further includes means to maintain the suppressor grid at a predetermined negative bias and wherein said control grid attains a negative bias through grid current rectification.

JOHANNES MARINUS van HOFWEEGEN.

References Cited in the file of this patent

UNITED STATES PATENTS

| Number | Name | Date |
|---|---|---|
| 2,374,265 | Baker et al. | Apr. 24, 1945 |

FOREIGN PATENTS

| Number | Country | Date |
|---|---|---|
| 126,071 | Australia | Dec. 2, 1944 |